United States Patent
Imura et al.

(10) Patent No.: US 10,097,059 B2
(45) Date of Patent: Oct. 9, 2018

(54) ROTATING ELECTRIC MACHINE

(71) Applicant: Hitachi, Ltd., Chiyoda-ku, Tokyo (JP)

(72) Inventors: Makoto Imura, Tokyo (JP); Takayuki Koyama, Tokyo (JP); Shigeki Nakae, Tokyo (JP); Motonobu Iizuka, Tokyo (JP); Masanori Matsumoto, Tokyo (JP); Hideyuki Ootaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/432,461

(22) Filed: Feb. 14, 2017

(65) Prior Publication Data

US 2017/0163116 A1 Jun. 8, 2017

Related U.S. Application Data

(63) Continuation of application No. PCT/JP2015/063707, filed on May 13, 2015.

(30) Foreign Application Priority Data

Aug. 20, 2014 (JP) .................................. 2014-167077

(51) Int. Cl.
*H02K 3/32* (2006.01)
*H02K 3/51* (2006.01)
*H02K 3/52* (2006.01)

(52) U.S. Cl.
CPC .................. *H02K 3/32* (2013.01); *H02K 3/51* (2013.01); *H02K 3/527* (2013.01)

(58) Field of Classification Search
CPC .......... H02K 3/48; H02K 3/487; H02K 3/345; H02K 3/34
USPC .................................................. 310/194, 214
See application file for complete search history.

(56) References Cited

U.S. PATENT DOCUMENTS

| | | | | |
|---|---|---|---|---|
| 3,766,417 | A * | 10/1973 | Hallenbeck | H02K 3/527 310/214 |
| 8,274,185 | B2 * | 9/2012 | Dutau | H02K 1/32 310/216.119 |
| 9,077,223 | B2 | 7/2015 | Imura et al. | |
| 2003/0184180 | A1 * | 10/2003 | Doherty | H02K 3/527 310/214 |
| 2005/0023924 | A1 * | 2/2005 | Tornquist | H02K 3/527 310/216.121 |
| 2005/0212373 | A1 * | 9/2005 | McDowall | H02K 3/527 310/214 |

(Continued)

FOREIGN PATENT DOCUMENTS

| | | |
|---|---|---|
| JP | 57-31045 U | 2/1982 |
| JP | 57-31052 U | 2/1982 |
| JP | 58-57273 U | 4/1983 |

(Continued)

OTHER PUBLICATIONS

International Search Report (PCT/ISA/210) issued in PCT Application No. PCT/JP2015/063707 dated Jul. 21, 2015 with English-language translation (four (4) pages).

(Continued)

*Primary Examiner* — Terrance Kenerly
(74) *Attorney, Agent, or Firm* — Crowell & Moring LLP

(57) ABSTRACT

A coil support structure including a coil spacer, a yoke spacer, and a support formed between the coil spacer and the yoke spacer. And the support has laterally protruding parts.

20 Claims, 19 Drawing Sheets

(56) References Cited

U.S. PATENT DOCUMENTS

2012/0025639 A1\* 2/2012 Zywot .................. H02K 3/527
                                                    310/54

FOREIGN PATENT DOCUMENTS

| JP | 59-41142 A | 3/1984 |
|---|---|---|
| JP | 1-150449 U | 10/1989 |
| JP | 2-110963 U | 9/1990 |
| JP | 4-2963 U | 1/1992 |
| JP | 10-42502 A | 2/1998 |
| JP | 2002-58188 A | 2/2002 |
| JP | 2008-283737 A | 11/2008 |
| WO | WO 2007/094350 A1 | 8/2007 |

OTHER PUBLICATIONS

Japanese-language Written Opinion (PCT/ISA/237) issued in PCT Application No. PCT/JP2015/063707 dated Jul. 21, 2015 (four (4) pages).

Japanese-language Office Action issued in counterpart Japanese Application No. 2014-167077 dated Oct. 24, 2017 with English translation (Six (6) pages).

\* cited by examiner

ROTATING ELECTRIC MACHINE

CROSS-REFERENCE TO RELATED APPLICATION

This application claims the priority of PCT Patent Application PCT/JP2015/063707 filed May 13, 2015.

BACKGROUND OF THE INVENTION

This inventive electrical rotating machine includes conventionally-known salient-pole rotor and a synchronous machine. A synchronous machine can control power factor by adjusting excitation so that operate in power factor of 1.0 or leading power factor. So a synchronous machine is widely used as a driving source of high capacity compressor and pump in plant system. Synchronous machine include two types, one being the revolving-armature type, and the other the revolving-field type. The revolving-field type is used as a driving force in high capacity machine in most cases.

FIG. 1 is a perspective view of the revolving-field type machine 1 in case of four magnetic field poles. FIG. 2 is a cross-sectional view of the revolving-field type machine. As predicted FIG. 2, the rotor 1 that have the tip ends of the respective magnetic field poles outwardly projecting as many as the number of the magnetic field poles are collectively called "salient-pole rotors". The stator 15 is formed outer side of the rotor 1 and the rotor 1 is included in the stator 15.

A pole body 1a is formed on a central part of the shaft 1c, and the pole body 1a makes up shanks of the magnetic field pole bodies. A pole shoe 2 makes up the head of the magnetic field pole, and the pole shoe 2 forms areas by projecting from side to side, and coils 4 wind around in the areas. Bolt holes are form on the pole shoe 2 that makes up the head of the magnetic field pole. Screw holes are formed on the pole body 1a, the pole shoe 2 joint with the pole body 1a by bolt 10s and hold the coils. When electric power is invested in the rotor 1 and stator 15, magnetic field formed rotor side and stators side are attracted each other, while the magnetic field are rotating with each rotating speed of the magnetic speed are synchronized.

FIG. 3 is an enlarged drawing of a part of FIG. 2. When the pole shoe 2 joint with the pole body 1a by bolt 10, each magnetic field pole bolt 10s are loaded centrifugal force corresponding to the weight of the coil 4 and pole shoe 2 and rotating them. Each magnetic field pole bolt 10s are loaded the centrifugal force directed around 0 degree and 90 degrees in the FIG. 3. As also shown FIG. 3, coil support structure 8 is mounted between each magnetic field pole. This structure is loaded centrifugal force. The centrifugal force occurs from the direction of both side of axis of 45 degrees in FIG. 3.

FIG. 4 is a perspective view of a coil support structure. As shown FIG. 4, the coil support structure includes bolt 10 10 which join this structure with the shaft 1c, the coil spacer 11 to provide electrical insulation between coil 4 and the structure 8, yoke spacer 12 to transmit fastening power to the shaft 1c and provide electrical insulation. During rotating, the bolt 10 is loaded all of the centrifugal force corresponding to the weight of the coil 4, each spacer 11 and the structure 8.

In order to speed up the rotating electric machine which has structure described above, to reduce in size and weight of the coil support structure and centrifugal force, to grow strength reliability of the fasten member are needed. For example, to grow stiffness of the structure 8 and bolt member and to improve the fatigue strength of them are needed. As shown in FIG. 5, a hole is formed in X axis direction in inner of the structure, the body of the bolt 10 is a raw state. This structure reduce the centrifugal force of weight of the structure. This related art disclose the coil support structure that reduce the centrifugal force by reducing weight of its structure.

SUMMARY OF THE INVENTION

However, the structure of related arts can't easily ensure the strength reliability of the bolt 10 fastener for speeding up the rotating electric machine. The following is the reason for this.

When the weight is loaded to bolt 10 fastener, the excessive load is determined by ratio of the stiffness of the bolt 10 and fastened member. The ratio is generally defined in coefficient of internal force. As shown in FIG. 5, the structure described in JP2002-58188 can't easily ensure the stiffness as fastened member because the hole is formed directly under the bottom of the bolt 10 fastener. And the load against the bolt 10 is big on the fastened member. Reducing centrifugal force by downsizing and lightening ends up increasing the loaded weight of the bolt 10.

To cope with this problem, it may be contemplated, for example, to increase the diameter of the bolt 10 or high strengthening of material. In increasing of the diameter of the bolt 10, to ensure a fastened member having clamp capacity and to downsize and lighten are trade-off relation. If a high strength material is used, it is not easy to reduce initiation stress because bolt axis cross-section area is not enough to bear the centrifugal force. And it is possible to cause the delayed fracture and suddenly brittle fracture for high strength material.

Thus the above related art can't solute the problem to speed up the rotating electric machine. To solve the above-described problems, it is needed to reduce the centrifugal force by downsize and lighten the coil support structure and to reduce loads applied to bolt 10 by ensuring the stiffness of the structure. One aspect of the inventive coil support structure and electric rotating machine are to solve this problem and to provide high reliable rotating electric machine.

To achieve the above-described object, a coil support structure including a coil spacer, a yoke spacer, and a support formed between the coil spacer and the yoke spacer. And the support has laterally protruding parts. An electrical rotation machine comprising a stator, a rotor movable about the stator, and a coil support structure mounted between magnetic field poles of the rotor. The coil support structure including a coil spacer a yoke spacer, and a support formed between the coil spacer and the yoke spacer, the support has laterally protruding parts.

According to the inventive coil support structure and the electric rotation machine, it is possible to reduce centrifugal force by downsize and lighten the coil support structure and to ensure the stiffness around the bolt 10 joints of the coil support structure. And it is possible to improve the reliability of the bolt 10 joints by reducing load applied to bolt 10s to realize high speed rotating electric machine.

DETAILED DESCRIPTION OF PREFERRED EMBODIMENTS

One or more inventive electrical rotating machine and coil support structure will be described in using figures. This electrical rotating machine includes a salient-pole rotor, its configuration will be described below.

First, a synchronous machine, one of the electric machines, will be described. Synchronous machine include two types, one being the revolving-armature type, and the other the revolving-field type.

Figure 1:
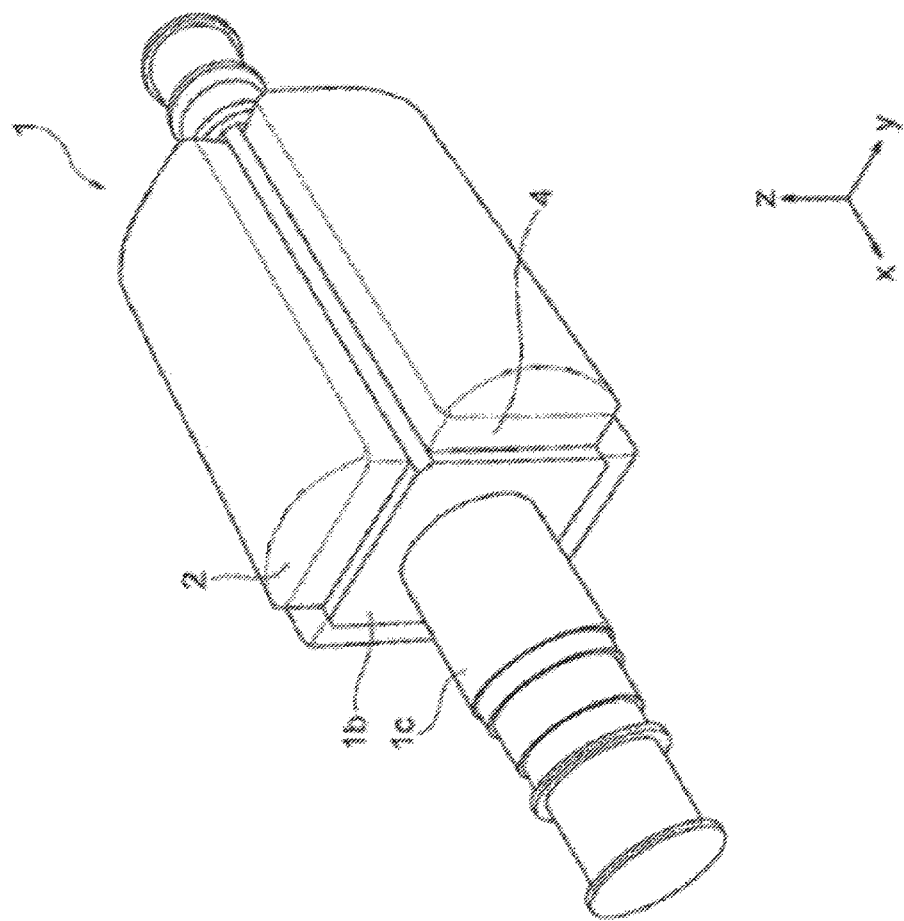
FIG. 1 is a perspective view of the inventive revolving-field type rotor.
Figure 2:
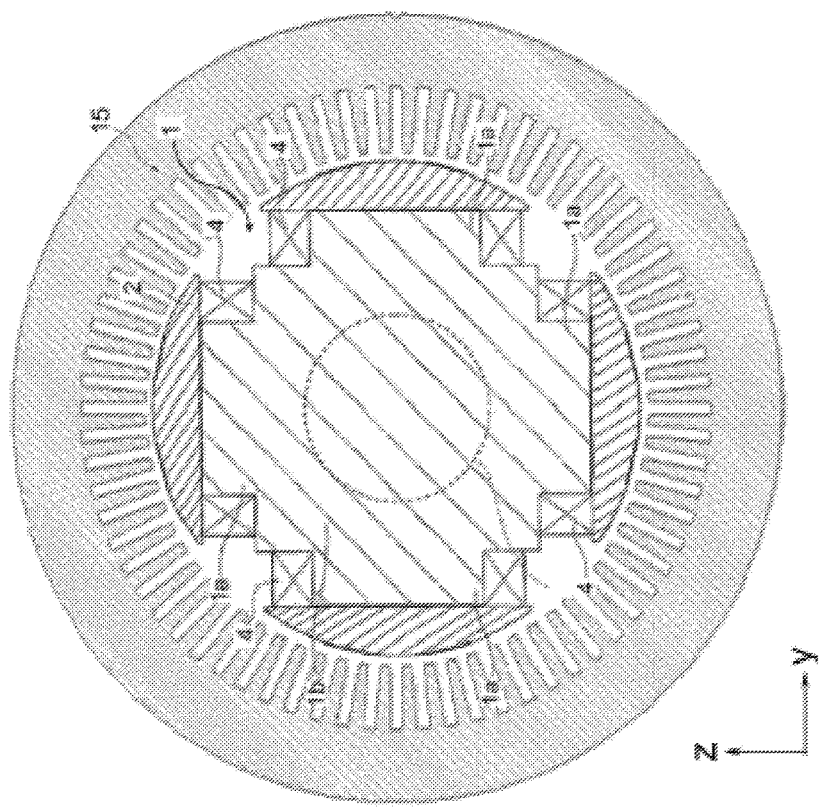
FIG. 2 is a rotating axis cross-sectional view of the inventive revolving-field type machine.

FIG. 1 is a perspective view of the revolving-field type rotor 1, as an example, a case in which four magnetic field poles are formed. FIG. 2 is a rotating axis cross-sectional view of the revolving-field type rotor 1. As depicted in FIG. 2, tip ends of the respective magnetic field poles outwardly project as many as the number of the magnetic field poles are collectively called "salient-pole rotors". Stator 15 is formed outer side of the rotor 1 and rotor 1 is included in the stator 15.

A pole body 1a is formed on a central part of the shaft 1c, and the pole body 1a makes up shanks of the magnetic field pole bodies 1a. A pole shoe 2 makes up the head of the magnetic field pole, and the pole shoe 2 forms areas by projecting from side to side, and cupper coils wind around in the areas. Bolt 10 holes are formed on the pole shoe 2 that makes up the head of the magnetic field pole. Screw holes are formed on the pole body 1a, the pole shoe 2 joint with the pole body 1a by bolt 10s and hold the coils. In the inner inside of the stators, sawtooth shapes projecting parts are formed at equal intervals in a periphery direction. A cupper wire wind around this part, the coils are formed in this part.

When electric power is invested in the rotor 1 and stator 15, a force is produced of magnetic field formed rotors side and stators side each other. The force makes the electric rotating machine rotate with each rotating speed of the magnetic speed are synchronized.

Figure 3:
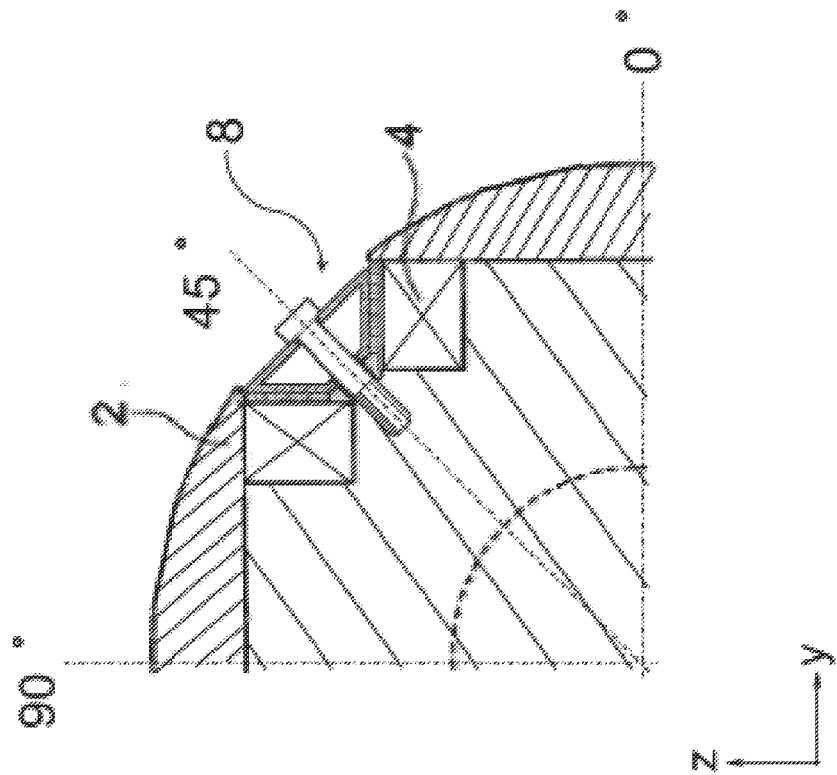
FIG. 3 is an enlarged drawing of a rotating axis cross-sectional view of inventive the revolving-field type machine.

FIG. 3 is an enlarged drawing of FIG. 2. When the pole shoe 2 joint with the pole body 1a by bolt 10s, each magnetic field pole bolt 10s are loaded centrifugal force corresponding to the weight of the coils and pole shoe 2s and rotating them. Each magnetic field pole bolt 10s are loaded the centrifugal force directed around 0 degree and 90 degrees in the FIG. 3. As shown FIG. 3, coil support structure are mounted between each magnetic field pole. This structure is loaded centrifugal force. The centrifugal force results from being pressed from rotating coils on direction of both side of axis of 45 degrees in FIG. 3. Also, this structure can prevent the coils from moving over in rotating. In general, the structured are mounted on the shaft corresponding to the direction of axis of X.

Next, the conventional coil support structure will be described.

Figure 4:
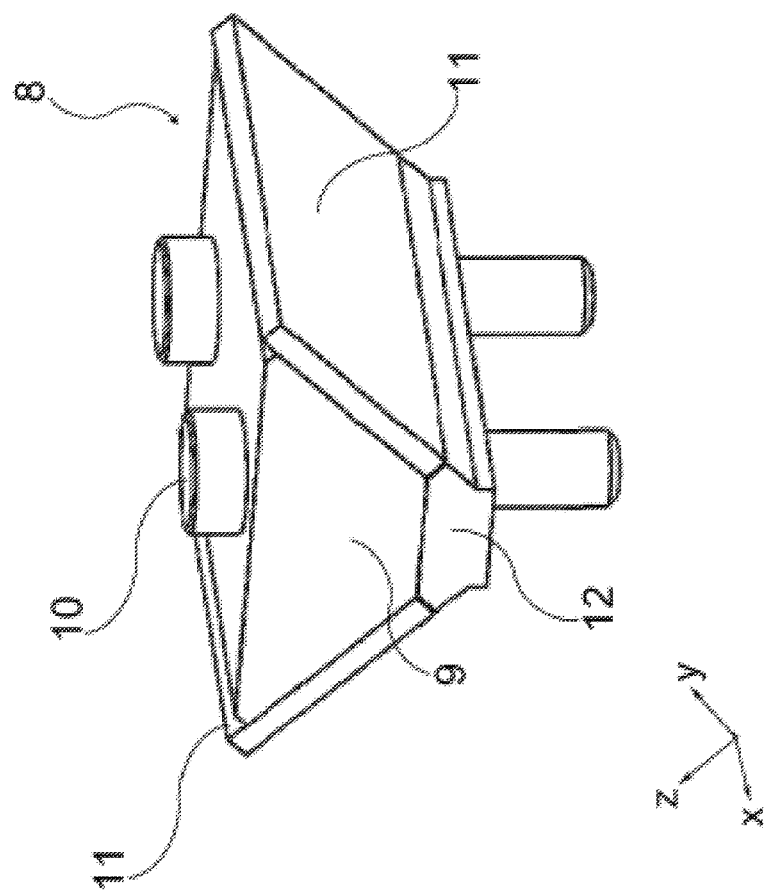
FIG. 4 is a perspective view of the conventional coil support structure.
Figure 5:
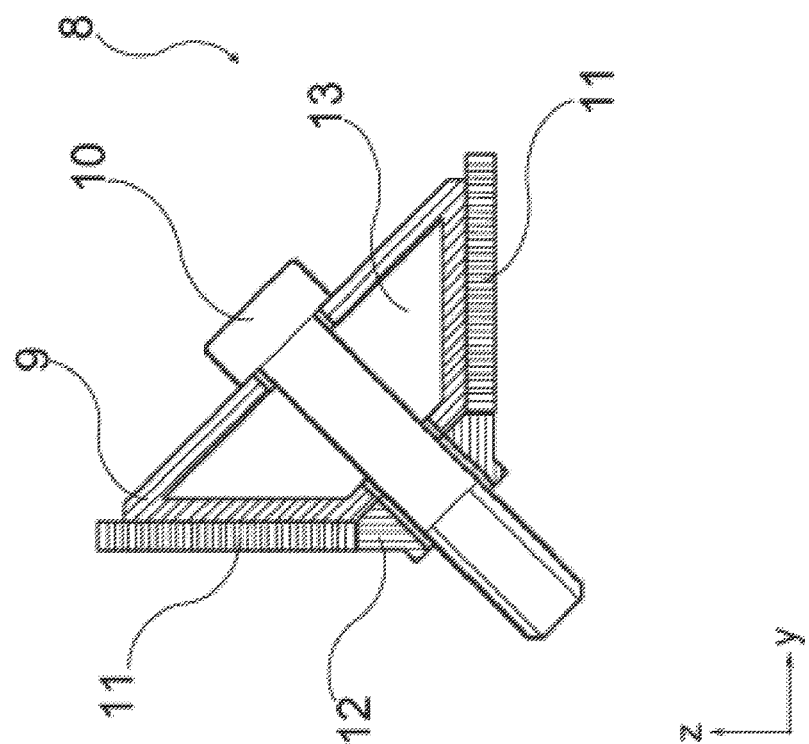
FIG. 5 is a cross-sectional view of the conventional rotating axis of coil support structure.
Figure 6:
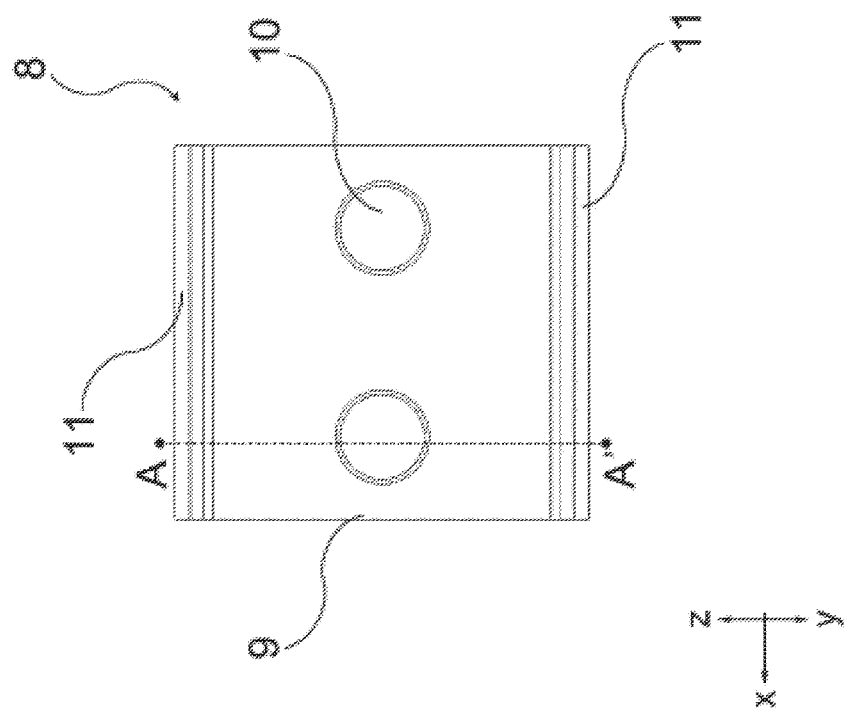
FIG. 6 is a top view of the conventional coil support structure.
Figure 7:
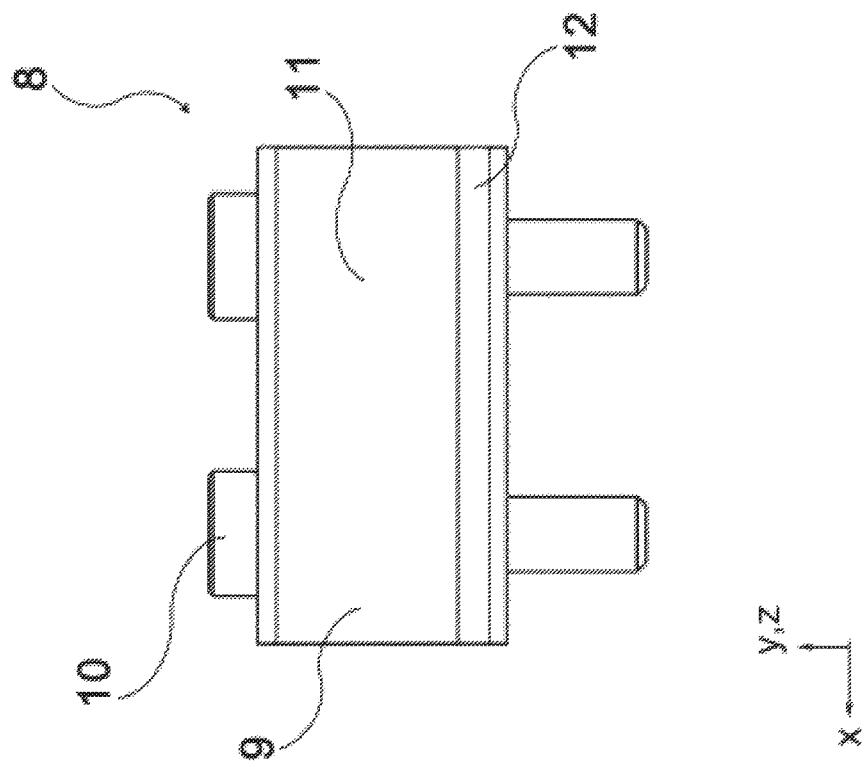
FIG. 7 is a side view of the conventional coil support structure.
Figure 8:
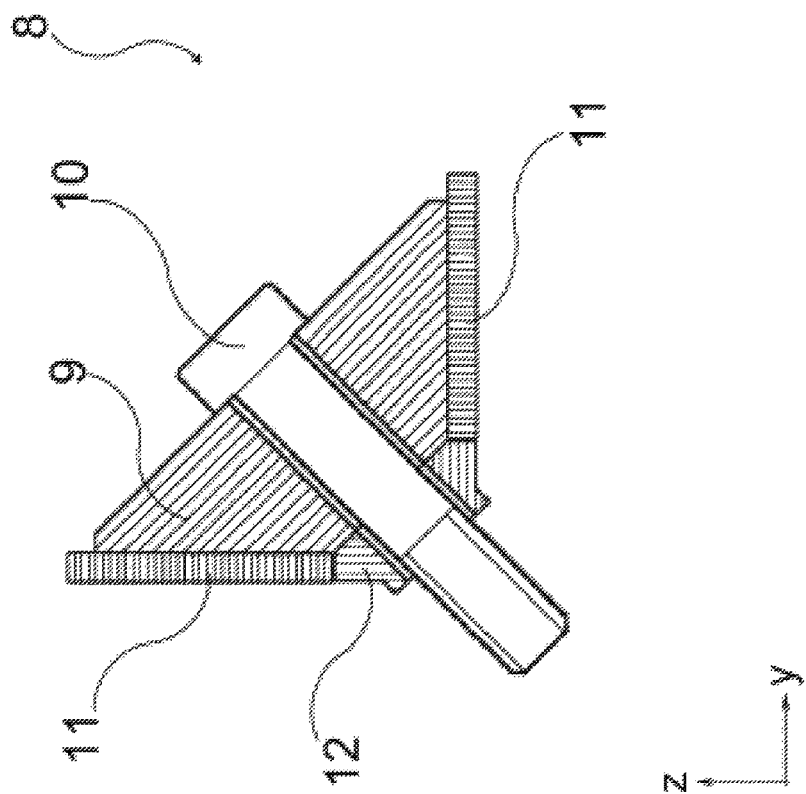
FIG. 8 is a rotating axis cross-sectional view of the conventional coil support structure.

FIG. 4 is a perspective view of the conventional coil support structure. FIG. 5 is a top view of the conventional coil support structure. FIG. 6 is a top view of the conventional coil support structure. FIG. 7 is a side view of the conventional coil support structure. FIG. 8 is a rotating axis cross-sectional view of the conventional coil support structure.

As depicted in FIG. 4, the coil support structure 8 comprises bolt 10s that fasten a support to the shaft, a coil spacer that transmits a centrifugal force to the support and provide electrical insulation to prevent the support from field current of coils, and a yoke spacer to transmit the bolt 10 fasting force to the shaft and to provide electrical insulation.

The support and the bolt 10 are mainly made by metal material. Because each spacer needs to have insulation performance, non-metallic material fiber reinforced resin laminated sheet that is lightweight and has enough stiff and strength is applied for the spacer. The bolt 10s are loaded centrifugal force corresponding to the weight of the coils, the spacer and support in rotating. In order to speed up the rotating electric machine, to reduce in size and weight of the coil support structure and to raise reliability of the bolt 10 fasten member.

As depicted in FIG. 5, the lightening hole is formed in the direction of X axis that corresponds to the direction of rotating shaft axis in the inside of the support. The body of the bolt 10 is exposed. It is possible to reduce the weight of the support and the centrifugal force.

In applying the centrifugal force to the bolt 10 fasten, the load is determined by the ratio the stiff of bolt 10 and the fastened member. The ratio is calculated by dividing the stiff of the bolt 10 by the stiff of the bolt 10 and fasten member. This ration is called internal coefficient.

The each stiff and its internal coefficient is divided into a tensile evaluation in the direction of bolt 10 axis which is related in applying the load to in direction of bolt 10 axis and bending evaluation of bolt 10 axis which is related in applying the moment to in direction of bolt 10 axis The stiff of the tensile evaluation is calculated by a Young ratio of each component part multiplies a rough circular area where fasten force with the bolt 10 applies, and divide by the length of the bolt 10 axial direction. The more bigger the circular area is, the more the stiff of bolt 10 and fasten member can improve the stiffness characteristic. On the other hand, the more the length of the bolt 10 axial direction, the less the stiff of bolt 10 and fasten member is. The square of the circular area impacts the characteristic of the stiffness determines, on the other hand, the ekayana of the length of the bolt 10 axial direction impacts the characteristic of the stiffness determines.

The stiffness of the bending evaluation is calculated by a Young ratio of each component part multiplies second moment of cylindrical area which is cross section of the circular area, and divide by the length of the bolt 10 axial direction. As with the tensile evaluation. The more bigger the circular area is, the more the stiff of bolt 10 and fasten member can improve the stiffness characteristic. On the other hand, the more the length of the bolt 10 axial direction, the less the stiff of bolt 10 and fasten member is. The cube of the circular area impacts the characteristic of the stiffness determines, on the other hand, the ekayana of the length of the bolt 10 axial direction impacts the characteristic of the stiffness determines.

If the hole which is installed inside the support is big, the centrifugal force is reduced by reducing the weight of the support. The hole is formed in such a way as to pass trough directly under the seat of the bolt 10 fasten, so the body of the bolt 10 is exposed, and the fasten member is hollow structures which is formed in direction of the rotary shaft. It is obvious that the stiffness of the hollow structures is less than the solid structures. The internal coefficient of the hollow structures is relatively bigger than the solid structures in both tensile and bending evaluation. So the load tends to become big even if centrifugal force reduces by light weighting.

In the inventive support structure, a coil support structure 8 can reduce the centrifugal force by downsizing and light weighting of the structure, and reduce the bolt 10 load by having enough stiffness of the support 9. The inventive electric machine structure and the coil support structure are explained below.

Figure 9:
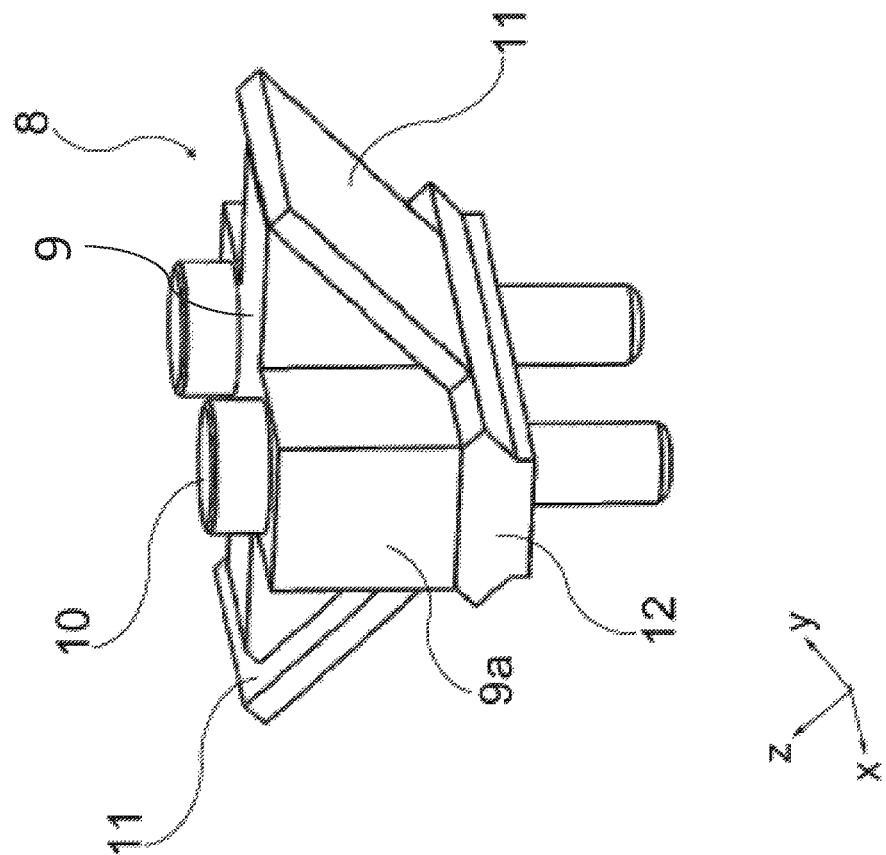
FIG. 9 is a perspective view of the inventive coil support structure.
Figure 10:
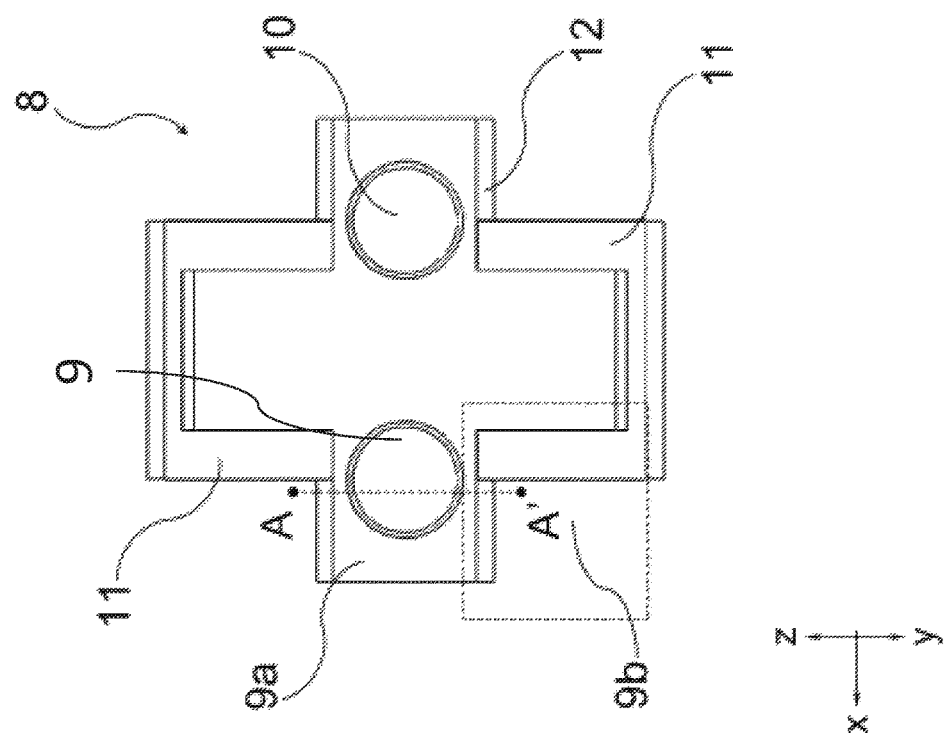
FIG. 10 is a top view of the inventive coil support structure.
Figure 11:
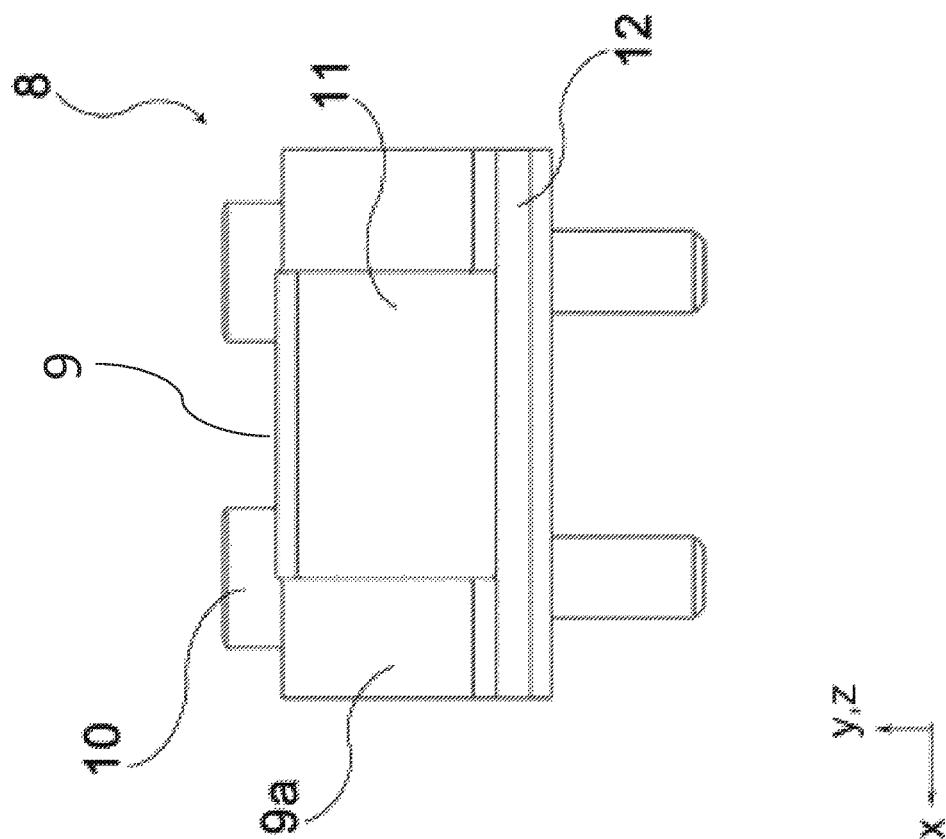
FIG. 11 is a side view of the inventive coil support structure.
Figure 12:
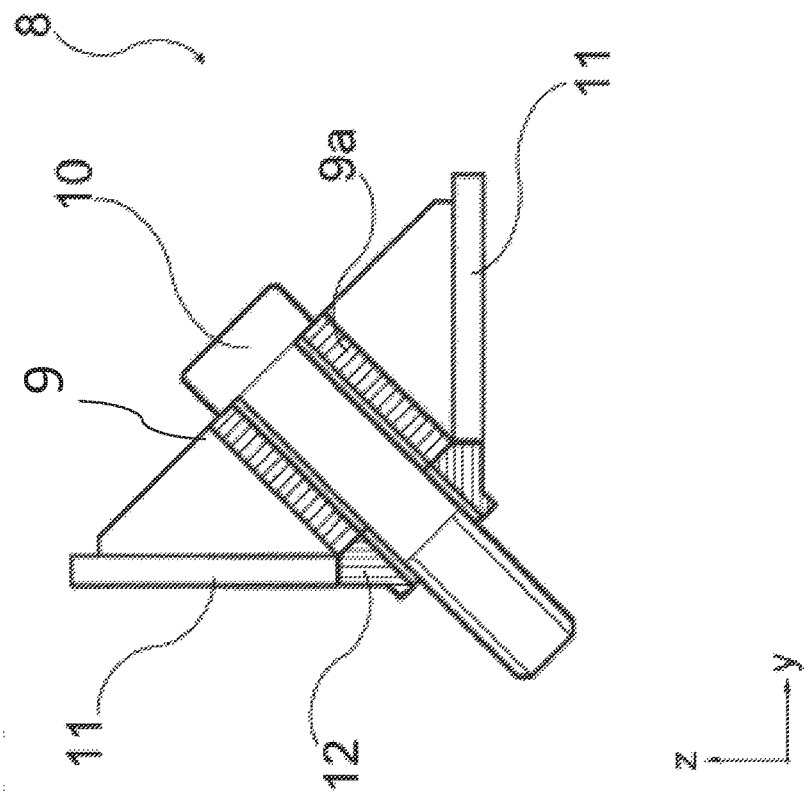
FIG. 12 is a cross-sectional view of the rotating axis of the inventive coil support structure.

FIG. 9 is a perspective view of the inventive coil support structure. FIG. 10 is a top view of the inventive coil support structure. FIG. 11 is a side view of the inventive coil support structure. FIG. 12 is a cross-sectional view of the rotating axis of the inventive coil support structure.

As depicted in FIG. 9, the coil support 8 comprises the bolt 10 which fasten the support 9 with the shaft 1c, coil spacer 11 and yoke spacer 12.

As depicted in FIG. 10, the top view of the support 9 has bilateral and front/rear symmetric shape. The top view of the support 9 has a cross-shaped. The support 9 is fastened by at least two bolt 10. The bolt 10 10 is arranged on the central line joining protruding parts 9a and fastened.

The structure of support 9 can ensure the fasten member stiffness of the area loading by bolt 10 fastening force. Therefore the support 9 has the protruding parts 9a whose both side is dented in direction of the rotation axis can reduce the size. This structure can reduce the centrifugal force that corresponds to the weight of support 9.

When the electric rotating machine rotates, current cooling indoor circulates the outside surface of the rotor 1 in direction of rotation axis. The current travels the outside surface of the rotor 1, so that the coil 4 can be cooled by the current directly. The structure 9 has protruding parts 9b, and therefore, the area which is formed by contacting the support 9 and coil spacer 10 can reduce compared to the related arts. Therefore, the structure of support 9 can also heighten an effect to secure the radiating area of coil 4.

Figure 13:
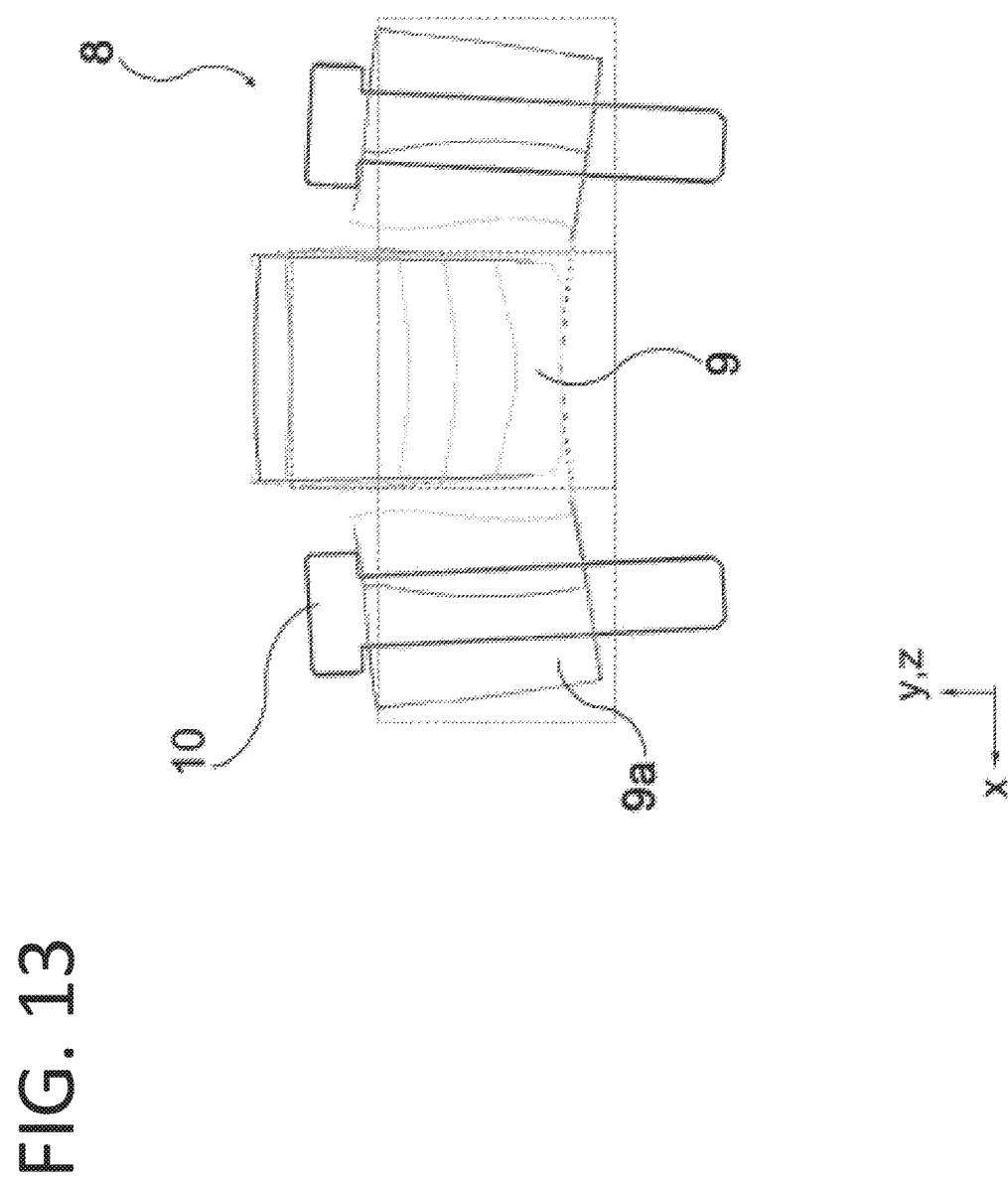
FIG. 13 is a diagram schematically illustrating a deformation of the inventive coil support structure by applying centrifugal force.

FIG. 13 is a diagram schematically illustrating a deformation of the inventive coil support structure by applying centrifugal force. In this structure, the center of the surface where the centrifugal force loads has an eccentric to bolt 10 axis line. So as depicted in FIG. 13, each bolt 10 bends deformation symmetrically.

However, in the inventive coil support structure, the fasten member is formed directly under the bottom of the bolt 10. So the bending deformation somewhat occurs, in the inventive coil support structure can reduce internal coefficient and the load as above. According to the inventive coil support structure, it is possible to reduce the load of the bolt 10 and improve the reliability of the strength of the bolt 10 fasten member.

Figure 14:
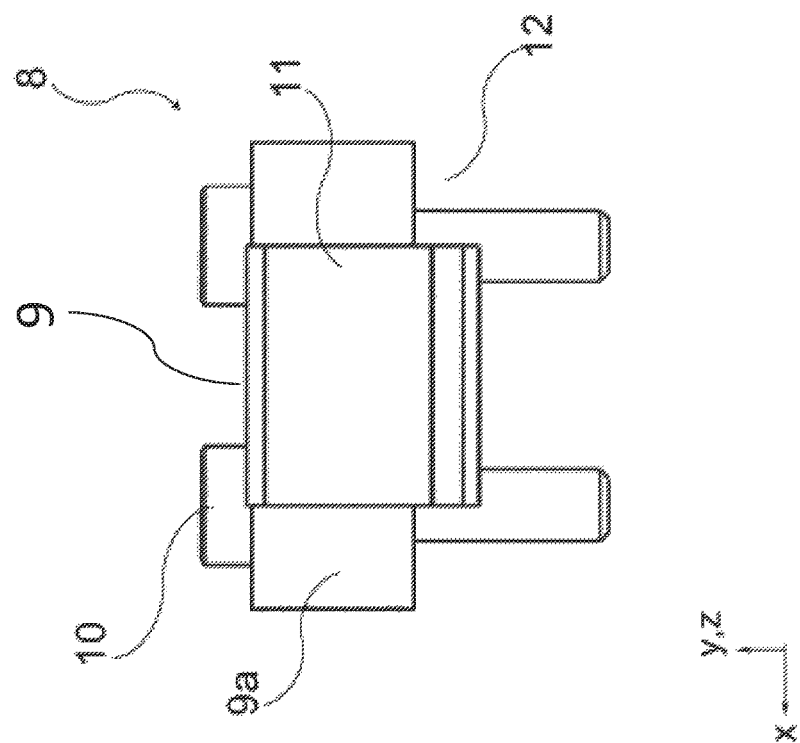
FIG. 14 is another yoke spacer of the inventive coil support structure.

FIG. 14 is another yoke spacer of the inventive coil support structure. As depicted in FIG. 14, the structure removing a part of the both side of the yoke spacer 12 is another inventive coil support structure. In directly under the bottom of the bolt 10, a part of the yoke spacer 12 traveling the tightening force to the shaft 11c is formed as a fasten member, and therefore, can reduce the internal coefficient and have about the same efficient of the structured described in FIG. 11.

Figure 15:
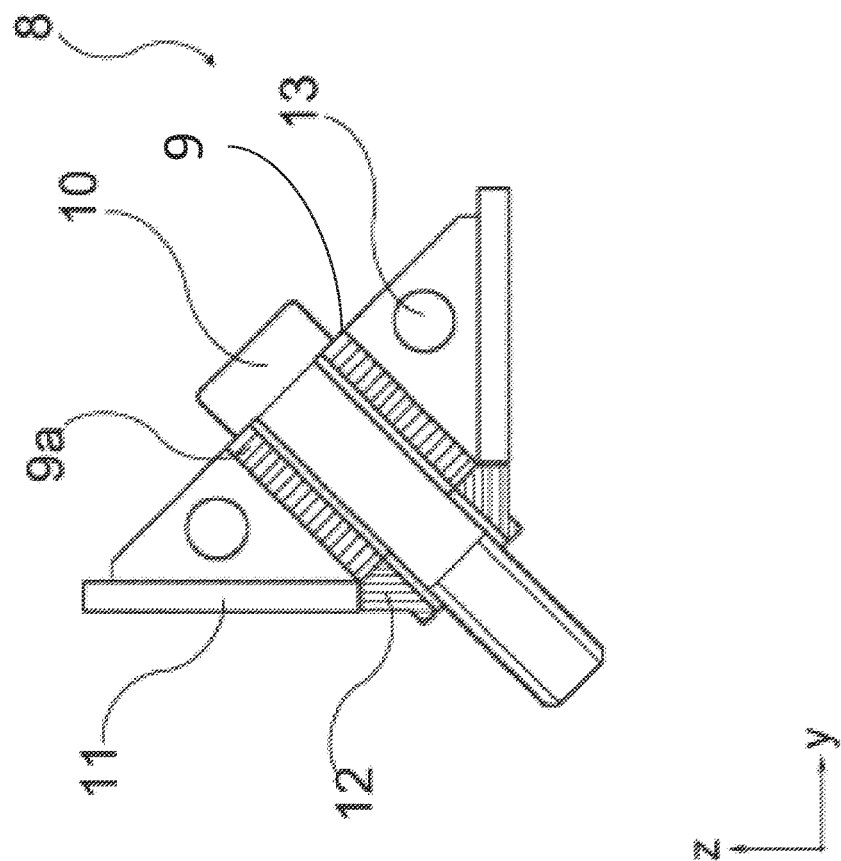
FIG. 15 is the AA' rotating axis cross-sectional view of another inventive coil support structure.
Figure 16:
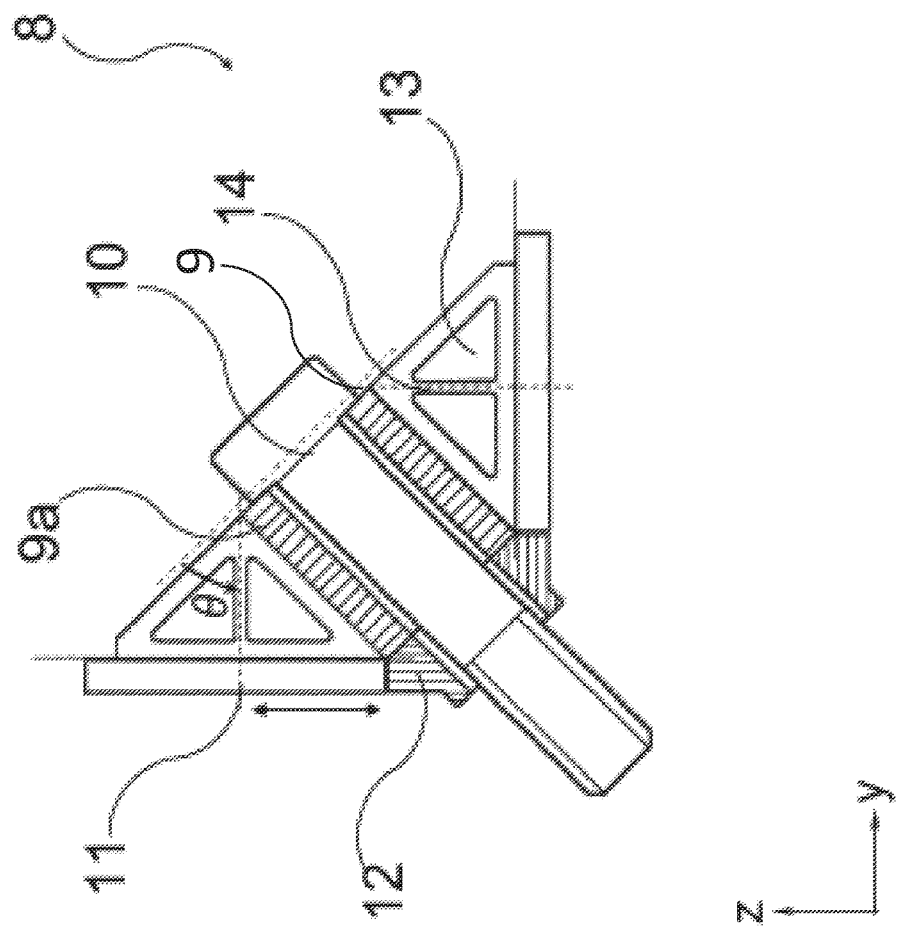
FIG. 16 is the AA' rotating axis cross sectional view of another inventive coil support structure.

FIG. 15 is the AA' rotating axis cross-sectional view of another inventive coil support structure. FIG. 16 is the AA' rotating axis cross-sectional view of another inventive coil support structure.

As depicted in FIG. 15 and FIG. 16, the both side of the portion 9a protrude from the support 9 is dented in the rotating axis, the dented area 9b has the trough hole 13 in direction of rotating axis. The shape of the hole 13 may be circle, triangle or polygonal as depicted in FIG. 15 and FIG. 16, if the hole has the stiffness to travel the centrifugal force of the coil 4 to the bolt 10 through the support 9.

As depicted in FIG. 16, the dented area 9b may have holes that combine these holes 13. In this case, the plate shape partitioning wall 14 that is formed between the hole 13 and the hole 13 maybe form as along the normal direction of the plane where the coil spacer 11 and the support 9 is attached. The normal direction of the plane is as shown by dotted line in FIG. 16.

When the wall 14 is formed along the normal direction, the inventive coil support structure prevents loading in an eccentric direction to the wall 14. Therefore, the inventive coil support structure distributes and guides the centrifugal force of the coil 4 through the support 9.

Therefore, plural number of the above plate shape partitioning wall 14 may be formed, and as above plural number of the above plate shape partitioning wall 14 may be formed as along the normal direction of the plane as shown dotted line in FIG. 16.

In the case magnetic field poles are four, one coil spacer 11 is leaned against another coil spacer 11 at about 90 degree angle. And the base plate of the bolt 10 is inclined at about 45 degree angle with the plate attached both coil spacer 11 and the support 9 as shown in FIG. 16. The plate shape partitioning wall 14 is also inclined at about 45 degree angle with the base plate of the bolt 10. The plate shape partitioning wall 14 is formed as along the normal direction of the plane against the plate that the coil spacer attaches the support 9 as shown dotted line in FIG. 16.

In the salient-pole rotor in the inventive electric rotating machine, the number of the magnetic field is an even number like 4, 6, 8, . . . 2n (here, n is 2 of an integer lager than 2). In this case, the plate shape partitioning wall 14 maybe form as along the normal direction of the plane against the plate that the coil spacer attaches the support 9 as shown dotted line in FIG. 16. Namely, θ created the base plate of the bolt 10 and the plate shape partitioning wall 14 is determined by about 90 degree angle divided by n here, n is 2 of an integer lager than 2) according to the number of the magnetic field. Thus, it is possible to prevent that the centrifugal force of the coil 4 loads against the plate shape partitioning wall 14 in eccentric direction and prevent the deforming of the bending deformation of the plate shape partitioning wall 14.

In order to have the truss structure that can efficiently distribute and travel the centrifugal force, it is desirable that at least one plate shape partitioning wall 14 forms with the base of bolt 10 as the starting point. However, the truss structure that at least one plate shape partitioning wall 14 doesn't form with the base of bolt 10 as the starting point may include in the inventive coil support structure.

For example, as the range is described by an arrow in the FIG. 16, on the plate attached both coil spacer 11 and the support 9, the plate shape partitioning wall 14 is formed between the central position of the height direction of the coil and the edge of the yoke spacer 12. The plate shape partitioning wall 14 is also formed the opposite side of this area.

In order to exert the stiffness of the bolt fasten member efficiently, it is desirable that the plate shape partitioning wall 14 is formed between the central position of the height direction of the coil and the edge of the yoke spacer 12 on the plate attached both coil spacer 11 and the support 9. That can increase a roughly circular area where fasten force with the bolt 10 applies.

The arrangement of the plate shape partitioning wall 14 in the inventive coil support structure is formed to prevent the bending deformation by the truss structure and exert the stiffness of the bolt 10 fasten member efficiently regardless of the shape of the hole 13 is circle or square shape. The structure in FIG. 15 and FIG. 16, the weight is smaller than the related arts in proportion to the weight of the hole 13 that is formed in the dented area 9b. It is possible to secure the stiffness of the bolt 10 fasten member of the support 9 and reduce the centrifugal force.

Figure 17:
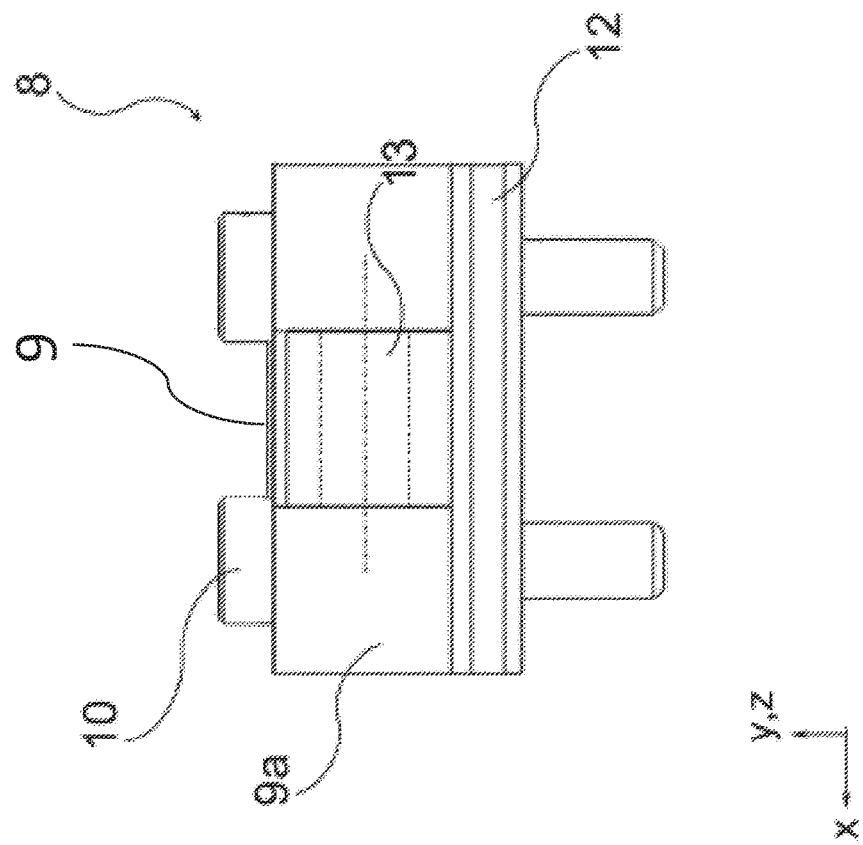
FIG. 17 is side view of another inventive coil support structure.
Figure 18:
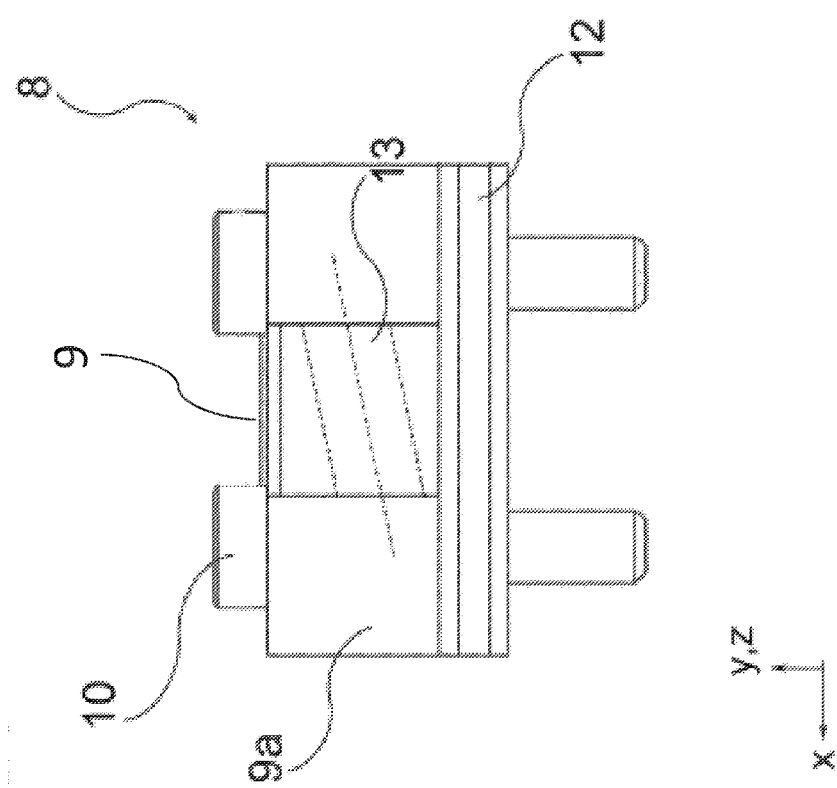
FIG. 18 is side view of another inventive coil support structure.

FIG. 17 is a side view of the inventive coil support structure as an alternative. FIG. 18 is a side view of the inventive coil support structure as an alternative.

As depicted in FIG. 17, the hole 13 is formed in the dented area 9b that is dented area of both side of the portion 9a protrude from the support 9 in direction of rotating axis. The central line of these hole 13 is described in FIG. 17 and is placed parallel to the direction of x-axis corresponds to the rotating axis. The central line of the hole 13 as shown dotted line in FIG. 18 may be inclination against the rotating axis. It is possible to improve the cooling effect of the inside air of the electrical rotating machine by the following reasons.

In rotating the electrical rotating machine, current cooling indoor circulates the outside surface of the rotor 1 in direction of rotation axis. The current travels the outside surface of the rotor 1. The direction of the current may circulate from either left side or right side the rotor 1 to other side. The direction of the current may circulate from both sides to the center of the rotor 1. The above hole 13 can have the ability of ventilation hole in the direction of rotating axis. If the hole forms angle, the difference of the pressure between inlet side opening and outlet side opening of the air flow is occured and the speed of the ventilation. It is also to circulate the inner air.

Figure 19:
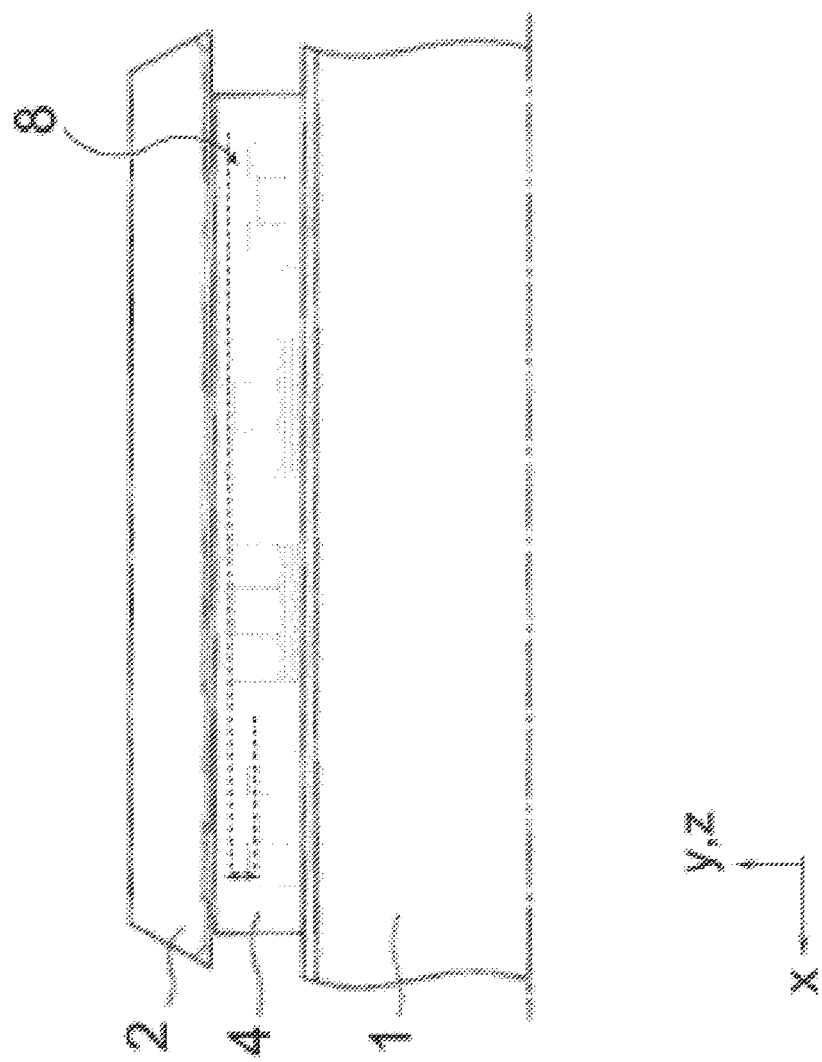
FIG. 19 is a side view of the inventive electric rotating machine including of the coil support structure.

FIG. 19 is a side view of the electric rotating machine including of the inventive coil support structure. As described above, the more tall the height of the coil support structure 8 in direction of the bolt 10 axis, the more the cooling air ventilation resistant increases not a little.

Therefore, as depicted in FIG. 19, the difference of the pressure between inlet side opening and outlet side opening of the air flow is occured by adjusting the height of the coil support structure 8 in the direction of the rotating axis for each stage. As a result it is possible to increase not a little the cooling efficiency As has been described above, the inventive coil support structure and electrical rotating structure can reduce the centrifugal force by miniaturization and light weighting, secure the stiffness of the around the area of the bolt 10 fasten member of the support 9 and improve the reliability of the bolt 10 fastening member by reducing the bolt 10 loading. It is possible to realize high speed rotating electric machine with conventionally-known salient-pole rotor and a synchronous machine.

The invention claimed is:

1. A coil support structure including:
   a coil spacer;
   a yoke spacer that is connected to the coil spacer; and
   a support formed between the coil spacer and the yoke spacer, wherein
      the support has laterally protruding parts that protrude away from the support along a first and a second direction that are orthogonal to one another,
      the laterally protruding parts that protrude in the first direction contact the coil spacer, and
      the laterally protruding parts that protrude in the second direction do not contact the coil spacer.

2. The coil support structure according to claim 1, wherein the support has a recess interposed between the laterally protruding parts.

3. The coil support structure according to claim 1, wherein the laterally protruding parts are formed in an alternating fashion around a perimeter of the support.

4. The coil support structure according to claim 1, wherein the coil spacer has a first area that contacts the support and a second area that does not contact the support.

5. The coil support structure according to claim 4, wherein the support is symmetrical along at least two directions.

6. The coil support structure according to claim 1, wherein one of the laterally protruding parts defines a plane perpendicular to a rotating axis of the rotor, the protruding part defines a trough hole, and the trough hole has an axis that extends in a direction of the rotating axis of the rotor.

7. The coil support structure according to claim 6, wherein the one of the laterally protruding parts has two or more plate shape partition walls, and the two or more plate shape partition walls are normal to the coil spacer.

8. The coil support structure according to claim 6, wherein the one of the laterally protruding parts has two or more plate shape partition walls and the two or more plate shape partition walls are incident against the coil spacer between the middle of the coil spacer and an edge of the yoke spacer.

9. The coil support structure according to claim 6, wherein an axis of the through hole is inclined relative to the rotating axis of the rotor.

10. The coil support structure according to claim 1, wherein the support defines a through opening configured to receive a bolt that fastens the support.

11. The coil support structure according to claim 10, further comprising: a second through opening, wherein the first and second through openings are arranged such that a line passing thorough a center of the first and second through openings also passes through a middle of the laterally protruding parts.

12. An electrical rotation machine comprising:
    a stator;

a rotor movable about the stator;
a coil support structure mounted between magnetic field poles of the rotor, the coil support structure including:
   a coil spacer,
   a yoke spacer that is connected to the coil spacer, and
   a support formed between the coil spacer and the yoke spacer, wherein
     the support has laterally protruding parts that protrude away from the support along a first and a second direction that are orthogonal to one another,
     the laterally protruding parts that protrude in the first direction contact the coil spacer, and
     the laterally protruding parts that protrude in the second direction do not contact the coil spacer.

13. The electrical rotation machine according to claim 12, wherein the support has a recess interposed between the laterally protruding parts.

14. The electrical rotation machine according to claim 12, wherein the laterally protruding parts are formed in an alternating fashion around a perimeter of the support.

15. The electrical rotation machine according to claim 12, wherein the coil spacer has a first area that contacts the support and a second area that does not contact the support.

16. The electrical rotation machine according to claim 15, wherein the support is symmetrical along at least two directions.

17. The electrical rotation machine according to claim 12, wherein one of the laterally protruding parts defines a plane perpendicular to a rotating axis of the rotor, the protruding part defines a trough hole, and the trough hole has an axis that extends in a direction of the rotating axis of the rotor.

18. The electrical rotation machine according to claim 17, wherein the one of the laterally protruding parts has two or more plate shape partition walls, and the two or more plate shape partition walls are normal to the coil spacer.

19. The electrical rotation machine according to claim 17, wherein the one of the laterally protruding parts has two or more plate shape partition walls and the two or more plate shape partition walls are incident against the coil spacer between the middle of the coil spacer and an edge of the yoke spacer.

20. The electrical rotation machine according to claim 12, further comprising a pole shoe that makes up a head of a magnetic field pole, wherein
   a height of two adjacent coil support structures is different, and
     the height is a distance between the laterally protruding parts and the pole shoe.

\* \* \* \* \*